United States Patent [19]

Leung

[11] Patent Number: 5,790,827

[45] Date of Patent: Aug. 4, 1998

[54] METHOD FOR DEPENDENCY CHECKING USING A SCOREBOARD FOR A PAIR OF REGISTER SETS HAVING DIFFERENT PRECISIONS

[75] Inventor: Arthur T. Leung, Sunnyvale, Calif.

[73] Assignee: Sun Microsystems, Inc., Sunnyvale, Calif.

[21] Appl. No.: 879,589

[22] Filed: Jun. 20, 1997

[51] Int. Cl.⁶ .............................. G06F 9/38; G06F 9/22
[52] U.S. Cl. .............................. 395/392; 395/393
[58] Field of Search .............................. 395/392, 393

[56] References Cited

U.S. PATENT DOCUMENTS

| | | | |
|---|---|---|---|
| 5,487,156 | 1/1996 | Popescu et al. | 395/393 |
| 5,488,730 | 1/1996 | Brown, III et al. | 395/800.41 |
| 5,497,499 | 3/1996 | Garg et al. | 395/393 |
| 5,546,593 | 8/1996 | Kimura et al. | 395/569 |
| 5,625,837 | 4/1997 | Popescu et al. | 395/800.23 |
| 5,630,157 | 5/1997 | Dwyer, III | 395/800.23 |
| 5,655,096 | 8/1997 | Branigin | 395/376 |
| 5,666,506 | 9/1997 | Hesson et al. | 395/392 |

*Primary Examiner*—Krisna Lim
*Attorney, Agent, or Firm*—B. Noel Kivlin; Conley, Rose & Tayon; Lawrence J. Merkel

[57] ABSTRACT

A dependency checking method includes a scoreboard which records destination operands of instructions outstanding within the pipeline of a microprocessor. Each single precision register maps to an indication within the scoreboard. Each double precision register which does not overlap with single precision registers maps to an indication within the scoreboard. Double precision registers which overlap single precision registers map to the set of indications corresponding to the overlapping single precision registers. Dependency checking for a source operand is performed by forming a first set of indications corresponding to the double precision registers and a second set of indications corresponding to the single precision registers, then selecting a dependency indication from these sets of indications in response to the source precision and the source register address. By forming the first and second sets of indications, the source register address can be used directly to select the dependency indication from each of the first and second sets of indications.

16 Claims, 7 Drawing Sheets

METHOD FOR DEPENDENCY CHECKING USING A SCOREBOARD FOR A PAIR OF REGISTER SETS HAVING DIFFERENT PRECISIONS

BACKGROUND OF THE INVENTION

1. Field of the Invention

This invention relates to the field of microprocessors and, more particularly, to dependency checking mechanisms within microprocessors.

2. Description of the Related Art

Superscalar microprocessors achieve high performance by executing multiple instructions per clock cycle and by choosing the shortest possible clock cycle consistent with the design. Superpipelined microprocessor designs, on the other hand, divide instruction execution into a large number of subtasks which can be performed quickly, and assign pipeline stages to each subtask. An extremely short clock cycle is the goal of superpipelined designs. By overlapping the execution of many instructions within the pipeline, superpipelined microprocessors attempt to achieve high performance. Many microprocessor designs employ a combination of superscalar and superpipeline techniques to achieve performance goals.

As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. Generally, a pipeline comprises a plurality of pipeline stages. Each pipeline stage is configured to perform an operation assigned to that stage upon a value while other pipeline stages independently operate upon other values. When a value exits the pipeline, the function employed as the sum of the operations of each pipeline stage is complete. For example, an "instruction processing pipeline" is a pipeline employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

A problem faced in both superscalar and superpipelined designs is dependency checking. Generally, a first instruction which is subsequent to a second instruction in program order has a dependency on the second instruction if a source operand of the first instruction is (at least in part) the destination operand of the second instruction. The second instruction provides a value used by the first instruction, and therefore the second instruction must be executed prior to the first instruction. Actions taken upon detection of dependency vary depending upon the design, but dependencies generally must be detected.

Dependency checking is difficult in both superscalar and superpipelined designs due to the number of instructions which may be outstanding within the pipeline (e.g. subsequent to dispatch and prior to forwarding of the data in response to executing the instruction). In superscalar designs, many execution units may be employed, each of which may be processing one or more instructions. In superpipelined designs, numerous pipeline stages may be operating upon different instructions concurrently. As mentioned above, many microprocessor designs employ both superscalar and superpipelining techniques, further increasing the number of instructions which may be outstanding. Checking dependencies among these numerous instructions may involve substantial logic involved in comparing the source operands of an instruction to the destination operands of the outstanding instructions.

Generally, a source operand is a value operated upon by a microprocessor in response to an instruction to produce a result. The result is stored according to a destination operand specified by the instruction. Depending upon the microprocessor architecture employed by a particular microprocessor, operands may be memory operands (i.e. operands stored in a memory location, a copy of which may be stored in an optional cache employed by the microprocessor) or register operands (i.e. operands stored in a register within a set of registers architecturally defined as part of the microprocessor). Many architectures, notably reduced instruction set complexity (RISC) architectures such as the Scalable Processor Architecture (SPARC™), specify load and store instructions for transferring operands from memory to registers. Other instructions specify register operands as source and destination operands.

The SPARC™ specifies a floating point register set which further complicates dependency checking. Generally, floating point operands are considered to have a precision, which refers to the number of bits in the significand and the size of the exponent. For example, the Institute for Electrical and Electronic Engineers (IEEE) have defined IEEE standard 754 in which a single precision floating point number comprises 8 bits of exponent and 23 bits of significand (not including the implied bit). Alternatively, a double precision floating point number includes 11 bits of exponent and 52 bits of significand. Additional precisions may be defined as desired.

The SPARC™ floating point register set includes a first set of registers for storing floating point double precision operands and a second set of registers for storing floating point single precision operands. Additionally, the storage allocated to the second set of registers overlaps with half of the double precision storage. Therefore, a dependency may exist between a double precision source operand and a single precision destination operand (or vice versa). Furthermore, the register addresses of the single precision registers and the double precision registers which overlap are generally not equal. Therefore, more complex circuitry than a simple compare of register addresses is used to determine if a dependency exists. Generally, a register address is a value which selects a particular register from a register set.

SUMMARY OF THE INVENTION

The problems outlined above are in large part solved by a dependency checking method in accordance with the present invention. The method includes maintaining a scoreboard which records destination operands of instructions outstanding within the pipeline of the microprocessor. Each single precision register maps to an indication within the scoreboard. Each double precision register which does not overlap with single precision registers maps to an indication within the scoreboard. Double precision registers which overlap single precision registers map to the set of indications corresponding to the overlapping single precision registers. Dependency checking for a source operand is performed by forming a first set of indications corresponding to the double precision registers and a second set of indications corresponding to the single precision registers, then selecting a dependency indication from these sets of indications in response to the source precision and the source register address. Advantageously, dependency checking may be performed rapidly despite the potential dependencies between registers of differing precisions and despite a large number of pipeline stages within the microprocessor. The rapid dependency checking may provide for higher frequency operation of the microprocessor, thereby leading to increased performance of the microprocessor.

By forming the first and second sets of indications, the source register address can be used directly to select the dependency indication from each of the first and second sets of indications. Double precision register addresses for registers which overlap single precision registers need not be decoded to select a corresponding dependency indication from the scoreboard. Dependency checking logic may thereby be simplified.

Broadly speaking, the present invention contemplates a method for dependency checking a source operand in a microprocessor. A plurality of indications corresponding to a first plurality of registers having a first precision and to a second plurality of registers having a second precision is stored in a scoreboard. The plurality of indications identify which of the first plurality of registers and the second plurality of registers are updated by instructions within a pipeline of the microprocessor. A first subset of the plurality of indications corresponding to the first plurality of registers is formed. Additionally, a second subset of the plurality of indications corresponding to the second plurality of registers is formed. A dependency indication is selected from the first subset of the plurality of indications if a source precision corresponding to the source operand is the first precision. On the other hand, the dependency indication is selected from the second subset of the plurality of indications if the source precision is the second precision.

The present invention further contemplates a method for dependency checking a source operand in a microprocessor. The microprocessor has a register file representing a first set of registers having a first precision and a second set of registers having a second precision. A first storage location within the register file is shared by one of the first set of registers and at least two of the second set of registers. A scoreboard is maintained indicating which of a plurality of storage locations which comprise the register file are updated by instructions within a pipeline of the microprocessor. The scoreboard indicates which portions of the first storage location are updated. A first set of indications are formed from the scoreboard. The first set of indications corresponds to the first set of registers. A second set of indications are also formed from the scoreboard. The second set of indications corresponds to the second set of registers. A dependency indication is selected from the first and second sets of indications in response to a source register address and a source precision corresponding to the source operand.

BRIEF DESCRIPTION OF THE DRAWINGS

Other objects and advantages of the invention will become apparent upon reading the following detailed description and upon reference to the accompanying drawings in which.

Figure 1:
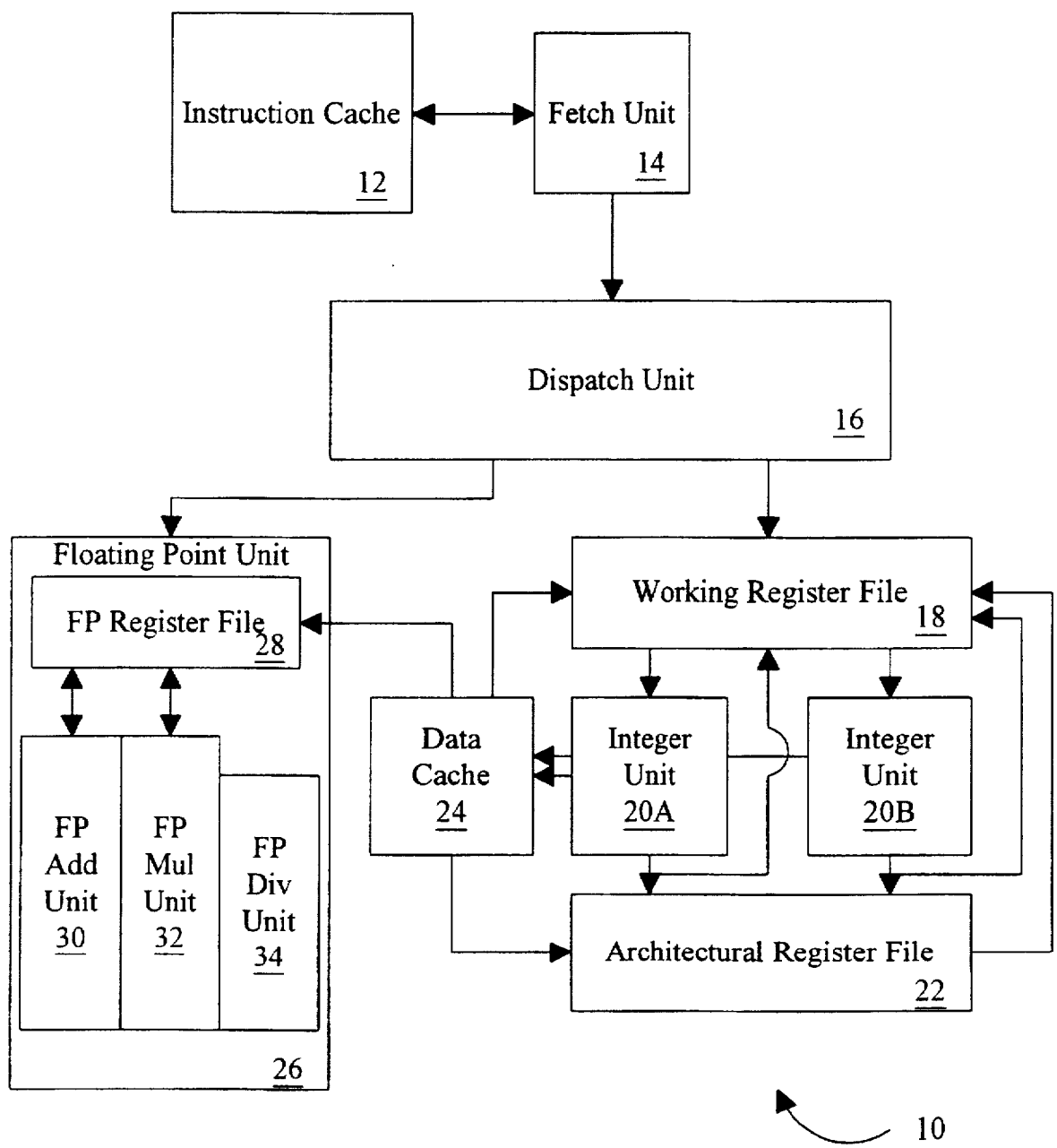
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. As shown in FIG. 1, microprocessor 10 includes an instruction cache 12, a fetch unit 14, a dispatch unit 16, a working register file 18, a plurality of integer units 20A and 20B, an architected register file 22, a data cache 24, and a floating point unit 26. Floating point unit 26 includes a floating point (FP) register file 28, an FP add unit 30, an FP multiply unit 32, and an FP divide unit 34. Instruction cache 12 is coupled to fetch unit 14, which is further coupled to dispatch unit 16. Dispatch unit 16 is in turn coupled to floating point unit 26 and working register file 18. Working register file 18 is coupled to integer units 20A and 20B, which are further coupled to architectural register file 22 and data cache 24. Data cache 24 is additionally coupled to FP register file 28. FP register file 28 is coupled to FP add unit 30 and FP multiply unit 32.

Generally speaking, dispatch unit 16 is configured to track floating point registers having an outstanding update (i.e. registers which are destination operands of instructions within the pipelines of the floating point execution units 30, 32 and 34 or integer units 20A and 20B, in the case of a load/store instruction) using a scoreboard. The scoreboard includes indications for each storage location within FP register file 28. Storage locations which are shared between a pair of single precision floating point registers and a double precision floating point register are represented by indications corresponding to each of the single precision registers. The indication corresponding to the double precision floating point register is formed by logically combining the indications corresponding to the single precision floating point registers. For example, each indication may be a bit indicative, when set, that an update to the corresponding register is outstanding. When clear, the bit indicates that no update is outstanding. The logical combination is an ORing function for this example.

The dispatch unit forms a set of double precision indications for the double precision registers by selecting the indications from the scoreboard which correspond to the double precision registers which are not overlapped by the single precision registers, and by performing the logical combination of the corresponding single precision indications to generate indications corresponding to the double precision registers which are overlapped. A set of single precision indications is formed by selecting the indications from the scoreboard which correspond to the single precision registers. Dependency checking may then be performed rapidly by selecting a dependency indication based upon the register address and the precision of a source operand being checked. The register address selects one of the set of double precision indications and one of the set of single precision indications, and the precision determines which of the sets of indications is to be selected from. Advantageously, a rapid dependency check may be performed even though the number of pipeline stages in which instructions may reside may be quite large. Furthermore, dependencies between different precision operands may be quickly resolved by the dependency checking logic employed by dispatch unit 16. Since the indications for the overlapping double precision registers and single precision registers are combined, the number of indications stored in the scoreboard may be less than the total number of addressable storage locations. For example, 32 single precision registers which overlap 16 of 32 double precision registers may be tracked by a scoreboard having 48 indications, even though there are 64 total addressable locations.

Furthermore, the scoreboard approach is scaleable to larger numbers of floating point pipelines. The scoreboard tracks outstanding register updates regardless of the number of pipelines and the number of pipeline stages within the pipelines.

Instruction cache 12 is a high speed cache memory for storing instructions. Instruction cache 12 may be structured in any suitable manner, including set associative or direct mapped structures.

Fetch unit 14 is configured to fetch instructions from instruction cache 12 and to provide the fetched instructions to dispatch unit 16. Fetch unit 14 may include branch prediction hardware in order to predict branch instructions taken or not taken. Instructions may be fetched from the predicted address and provided to dispatch unit 16. If a branch misprediction is detected, the fetched instructions are discarded and the correct instructions fetched.

Fetch unit 14 also performs predecoding upon the fetched instructions. The information generated by fetch unit 14 is used to aid dispatch unit 16 in the dispatching of instructions. For example, fetch unit 14 may identify each instruction as either a floating point instruction (for dispatch to floating point unit 26), or an integer instruction (for dispatch to integer units 20A and 20B). Additionally, fetch unit 14 may identify the precision selected by the floating point instructions. According to one embodiment, each instruction encoding indicates which precision is selected via the opcode portion of the instruction. Additional predecoding may be implemented in various embodiments as well.

Dispatch unit 16 receives instructions from fetch unit 14 and dispatches the instructions to integer units 20A-20B or floating point unit 26. Generally, dispatch unit 16 applies a set of dispatch rules to the instructions eligible for dispatch, and dispatches as many instructions as possible during each clock cycle according to the dispatch rules. In one embodiment, the dispatch rules include inhibiting dispatch of an instruction if one or more of the source operands for the instruction is dependent upon another instruction within the instruction pipelines of floating point unit 26 or integer units 20A-20B. Additionally, instructions are dispatched in program order. Other dispatch rules may be implemented according to design choice in various embodiments. In particular, instructions may be dispatched out of program order in other embodiments.

Working register file 18 is used to store operands for reading by instructions being dispatched to integer units 20A-20B. Integer instructions are selected for dispatch by dispatch unit 16 and conveyed to working register file 18, from which the operands are read. The operands and the instruction are subsequently conveyed to the integer unit 20A-20B selected by dispatch unit 18 to execute the instruction. Integer units 20A-20B employ pipelines having one or more stages for executing the instructions, after which the results are written to architectural register file 22 and working register file 18. Working register file 18 and architectural register file 22 are both used for storing integer operands. Architectural register file 22 includes storage for each architected register, while working register file 18 is used to store register values currently in use by integer units 20A-20B. Since working register file 18 is smaller than architectural register file 22, working register file 18 may be accessed more quickly than architectural register file 22. Additionally, working register file 18 may be updated with speculative results and may be recovered from architectural register file 22.

Integer units 20A and 20B may be symmetrical or asymmetrical execution units. Symmetrical execution units are configured similarly, and therefore can execute the same subset of the instructions set employed by microprocessor 10 (e.g. the integer instructions). Asymmetrical execution units employ dissimilar hardware. In this case, the combination of integer units 20A-20B include enough hardware to execute each of the integer instructions. Additionally, a dispatch rule employed by dispatch unit 16 is created in the case of asymmetrical units to ensure that each instruction is dispatched to a unit configured to execute that instruction.

Integer units 20A-20B are also configured to execute load and store memory operations in order to fetch memory operands. For example, the SPARC™ architecture defines load/store instructions. Load instructions fetch memory operands from memory and place the operands into registers for access by other instructions. Store instructions fetch register operands and stored them into memory as specified by a memory operand. Integer units 20A-20B access data cache 24 in order to perform memory operations. Data cache 24 is a high speed cache memory for storing data (i.e. memory operands upon which microprocessor 10 operates in response to a program being executed). Data cache 24 may employ any structure, such as a set-associative or direct-mapped structure. Data cache 24 routes memory operands read in response to load memory operations to either (i) FP register file 28 or (ii) architectural register file 22 and working register file 18, depending upon whether the destination operand of the load memory operation is an integer register or a floating point register.

Dispatch unit 16 dispatches floating point instructions to floating point unit (FPU) 26. The floating point instructions read operands from FP register file 28. The instructions and corresponding operands are then routed to either FP add unit 30 or FP multiply unit 32. Floating point add/subtract type instructions are executed by FP add unit 30, while floating point multiply/divide type instructions begin execution in FP multiply unit 32. Multiply operations complete within FP multiply unit 32, while floating divide and square root computations are routed to FP divide unit 34 from the first stage of the pipeline within FP multiply unit 32. Floating point divide and square root functions use more pipeline stages that multiply functions in the embodiment of FPU 26 shown in FIG. 1. Furthermore, the number of stages may vary depending upon the operands for the divide and square root instructions. Hence, the divide and square root operations are executed in the divide pipeline.

Figure 2:
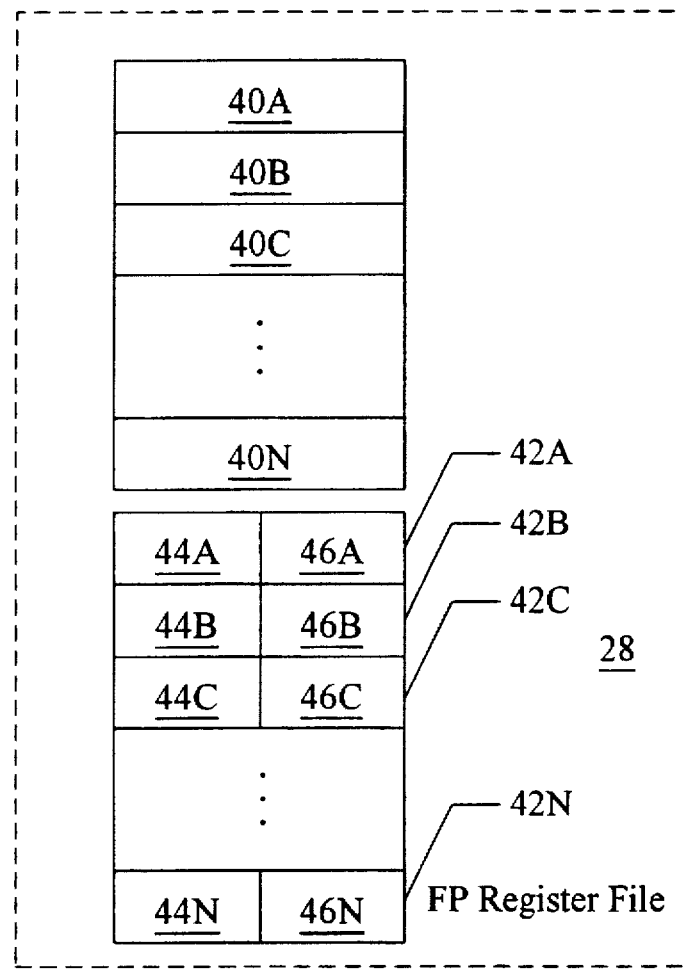
FIG. 2 is a block diagram of one embodiment of a floating point register file within the microprocessor shown in FIG. 1.

Turning now to FIG. 2, a block diagram of the arrangement of one embodiment of FP register file 28 is shown. The embodiment of FP register file 28 shown in FIG. 2 is compatible with the SPARC™ definition, according to one embodiment. As shown in FIG. 2, FP register file 28 includes a first set of storage locations 40A–40N and a second set of storage locations 42A–42N. In one embodiment, FP register file 28 includes 16 storage locations 40A–40N and 16 storage locations 42A–42N. It is noted that any number of storage locations 40A–40N and of storage locations 42A–42N according to the number of registers defined in the floating point register sets. Furthermore, the number of storage locations 40A–40N may differ from the number of storage locations 42A–42N. Storage locations 42A–42N are divided into an upper portion (e.g. reference numerals 44A–44N) and a lower portion (e.g. reference numerals 46A–46N).

Each of storage locations 40A–40N are addressable as a double precision floating point register. On the other hand, storage locations 42A–42N are addressable as either a double precision floating point register or a pair of single precision floating point registers. Each storage location 42A–42N is mapped to a double precision register address and a pair of single precision register addresses. For example, if a double precision register address mapped to storage location 42A is presented to FP register file 28 for reading, the value stored in both upper portion 44A and lower portion 46A is returned. Similarly, an update value provided during a write with a double precision register address mapped to storage location 42A is stored into storage location 42A (i.e. the upper portion of the update value in storage location 44A and the lower portion of the update value in storage location 46A). A single precision register address which maps to storage location 42A, on the other hand, is further used to select which of upper portion 44A or lower portion 46A is being addressed. Therefore, FP register file 28 receives both the register address and the precision corresponding to an operand in order to select the correct storage location 40A–40N or 42A–42N. Similarly, dependency checking between source operands and destination operands of instructions which are outstanding within FPU 26 involves both the precision and the register address.

Figure 3:
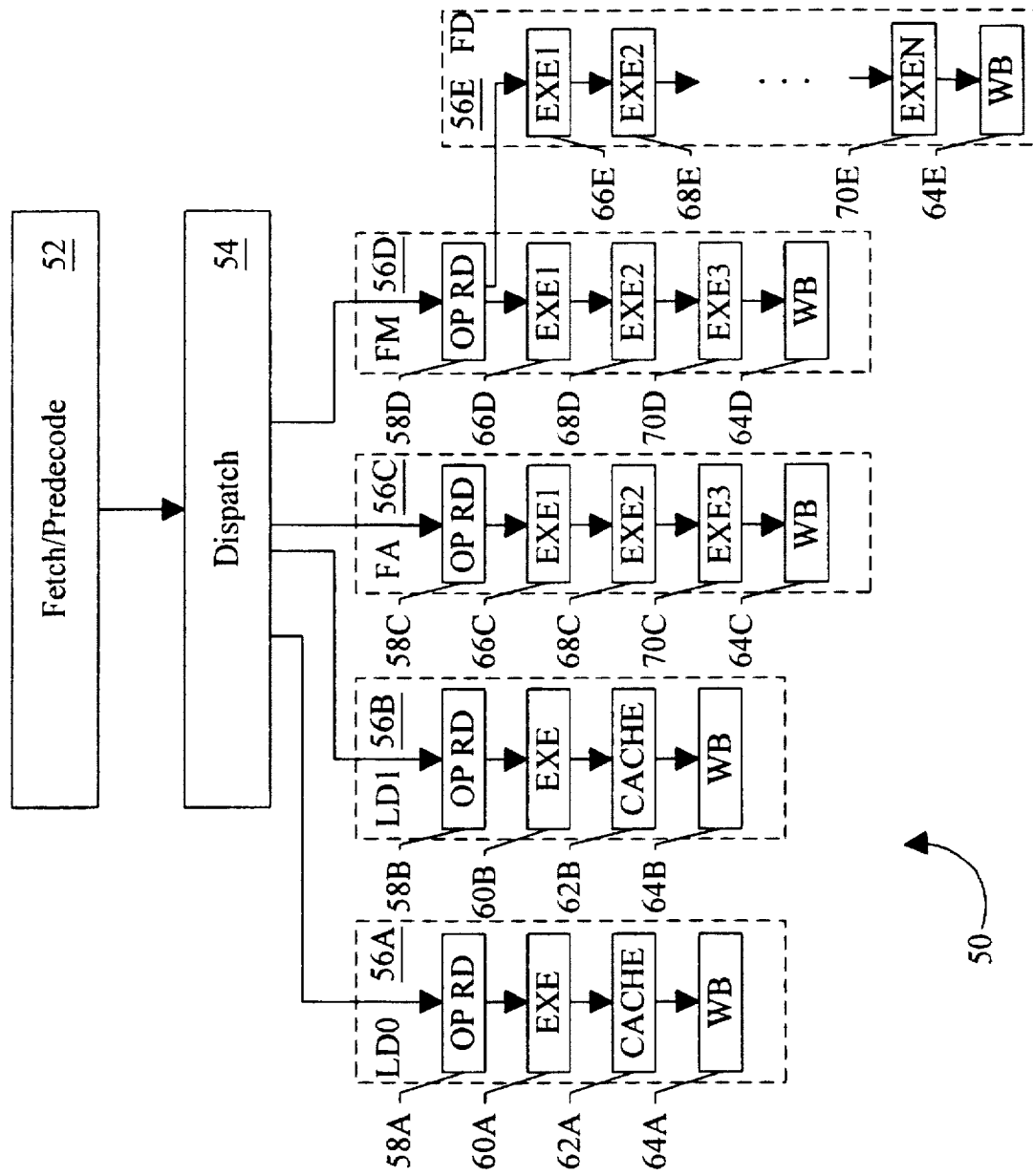
FIG. 3 is a pipeline diagram of one embodiment of a floating point pipeline employed by the microprocessor shown in FIG. 1.

Turning next to FIG. 3, a pipeline diagram illustrating an exemplary floating point pipeline 50 which may be employed by one embodiment of microprocessor 10 is shown. As shown in FIG. 3, pipeline 50 includes a fetch/predecode stage 52, a dispatch stage 54, and a plurality of execution pipelines 56A–56E (e.g. an LD0 pipeline 56A, LD1 pipeline 56B, FA pipeline 56C, FM pipeline 56D, and FD pipeline 56E). LD0 pipeline 56A includes an operand read stage 58A, an execute stage 60A, a cache stage 62A, and a writeback stage 64A. Similarly, LD1 pipeline 56B includes an operand read stage 58B, an execute stage 60B, a cache stage 62B, and a writeback stage 64B. Similar stages to operand read stages 58A–58B are labeled within FA pipeline 56C and FM pipeline 56D with reference numerals 58C–58D. Similar stages to writeback stages 64A–64B are labeled within FA, FM, and FD pipelines 56C–56E with reference numerals 64C–64E. Additionally, FA pipeline 56C and FM pipeline 56D respectively include first execute stages 66C and 66D, second execute stages 68C and 68D, and third execute stages 70C and 70D. FD pipeline 56E includes first execute stage 66E, second execute stage 68D, etc., through $N^{th}$ execute stage 70E. LD0 pipeline 56A and LD1 pipeline 56B are implemented within integer units 20A and 20B. FA pipeline 56C is implemented within FP add unit 30. Similarly, FM pipeline 56D is implemented within FP multiply unit 32 and FD pipeline 56E is implemented within FP divide unit 34.

LD0 and LD1 pipelines 56A–56B are used to perform floating point load/store instructions. LD0 pipeline 56A will be described, and LD1 pipeline 56B is similar. During operand read stage 58A, integer register operands are read from working register file 18. During execute stage 60A, the operands are added to form an address corresponding to the memory operand being read. If address translation is enabled, this address is a virtual address and is presented to a translation lookaside buffer (TLB) for conversion to a physical address. During cache stage 63A, the address indexes into data cache 24 and selects the requested data (if the address is a hit, determined by comparing the translated address presented by the TLB to the tag corresponding to the selected cache line). During writeback stage 64A, the requested data is stored into the destination floating point register. For dependency checking purposes, a dependency upon the destination operand of a floating point load instruction exists for a subsequent floating point instruction which uses the destination operand as a source operand until the floating point load instruction exits either LD0 pipeline 56A or LD1 pipeline 56B (whichever pipeline it was dispatched to). According to one embodiment, microprocessor 10 may forward data from cache stages 62A–62B if a dependency is detected, in which case the dependency exists until the floating point load instruction exits the cache stage 62A or 62B. Generally, a dependency exists until the data corresponding to the destination operand of the load/store instruction is available as a source operand of the dependent instruction.

FA pipeline 56C and FM pipeline 56D include operand read stages and writeback stages similar to the description above, except that FP register file 28 is accessed in operand read stages 58C and 58D. Additionally, execution of the floating point instructions within pipelines 56C and 56D is divided into three stages during which the specified arithmetic operation is carried out. Similarly, FD pipeline 56E includes a variable number of execution stages including stages 66E, 68E, and 70E over which execution of the divide and square root operations is accomplished. For dependency checking purposes, a dependency upon the destination operand of a floating point instruction within pipelines 56C–56E exists for a subsequent floating point instruction which uses the destination operand until the floating point instruction exits the corresponding pipeline 56C–56E. According to one embodiment, microprocessor 10 may forward data from execute stages 70C–70E if a dependency is detected, in which case the dependency exists until the floating point instruction exits the corresponding execute stage 70C–70E. Similar to the load/store pipelines, a dependency generally exists until the data corresponding to the destination operand of the floating point instruction is available as a source operand of the dependent instruction.

Rather than including comparator circuitry and other dependency checking logic for handling precision differences at each of the execution pipeline stages within execution pipelines 56A–56E, dispatch unit 16 employs a scoreboard for tracking which floating point registers have outstanding updates. The scoreboard stores indications corresponding to each storage location 40A–40N. Additionally, the scoreboard stores indications corresponding to upper portions 44A–44N and lower portions 46A–46N of storage locations 42A–42N. In a first state, the indication identifies an outstanding update for the corresponding storage location. Conversely, the indication identifies no outstanding update for the corresponding storage location in a second state. Selecting dependency indications from the scoreboard which correspond to the source operands of instructions being considered for dispatch may be performed more rapidly (i.e. in fewer levels of logic) than performing dependency checks against each execution pipeline stage. The scoreboard dependency checking circuitry may therefore be more suitable than conventional comparator-based checking for high frequency implementations of microprocessor 10.

It is noted that, although FD pipeline 56E is described as a pipeline for clarity, FP divide unit 34 may be non-pipelined according to one embodiment. In this case, the pipeline stages shown in FD pipeline 56E represent clock cycles used to perform an operation. However, a new operation may not be placed into the FD "pipeline" until the current operation is finished. The scoreboards within dispatch unit 16 handle either pipelined, non-pipelined, or mixed implementations since the latency of an operation is tracked in order to remove an indication of dependency from the scoreboard (as opposed to the pipeline stage in which the operation is executing).

Figure 4:
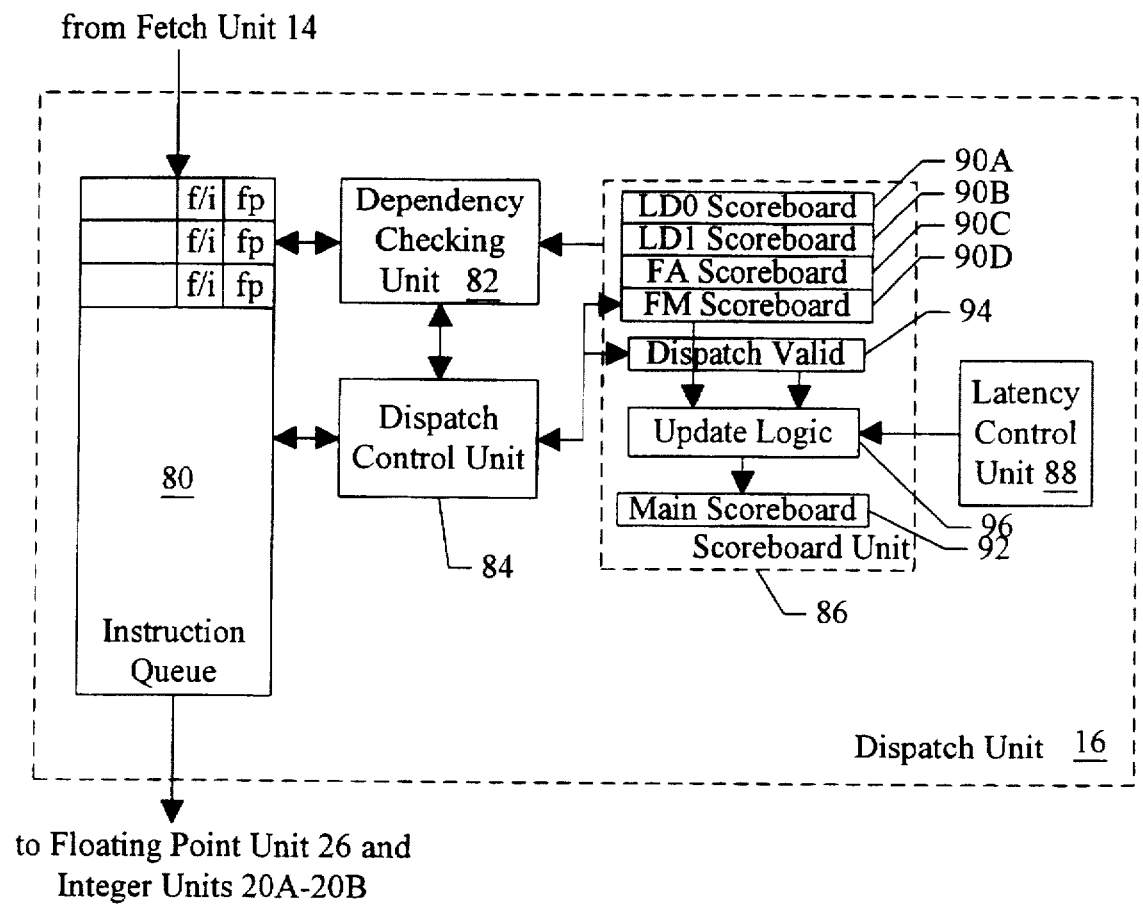
FIG. 4 is a block diagram of one embodiment of a dispatch unit shown in FIG. 1.

Turning next to FIG. 4, a block diagram of one embodiment of dispatch unit 16 is shown. As shown in FIG. 4, dispatch unit 16 includes an instruction queue 80, a dependency checking unit 82, a dispatch control unit 84, a scoreboard unit 86, and a latency control unit 88. Scoreboard unit 86 includes a plurality or preliminary scoreboards 90A–90D and a main scoreboard 92, as well as a dispatch valid storage 94 and update logic 96. Instruction queue 80 is coupled to receive instructions from fetch unit 14. Additionally, instruction queue 80 is coupled to provide instructions to floating point unit 26 and integer units 20A–20D under the control of dispatch control unit 84. Instruction queue 80 is coupled to both dependency checking unit 82 and dispatch control unit 84. Dependency checking unit 82 is coupled to dispatch control unit 84 and to scoreboard unit 86. Dispatch control unit 84 is coupled to preliminary scoreboards 90A–90D, main scoreboard 92, and dispatch valid storage 94. Latency control unit 88 is coupled to update logic 96.

Dependency checking unit 82 uses preliminary scoreboards 90A–90D and main scoreboard 92 to determine if dependencies exist for floating point instructions within instruction queue 80 which are being considered for dispatch. If a dependency is detected, dependency checking unit 82 informs dispatch control unit 84. Among the dispatch rules employed by dispatch control unit 84 is the rule that a floating point instruction is not dispatched if a dependency upon a source operand of the floating point instruction is detected by dependency checking unit 82.

Dependency checking unit 82 detects floating point instructions using the predecode data provided by fetch unit 14 for each instruction. FIG. 4 illustrates an f/i field within each instruction entry in instruction queue 80. The f/i field indicates the type of instruction (floating point or integer). Additionally, the precision selected for the instruction is indicated by the floating point precision field (shown as fp in instruction queue 80). Using the precision and the source register addresses, dependency checking unit 82 selects dependency indications from preliminary scoreboards 90A–90D and main scoreboard 92. The selected dependency indications are then logically combined to determine if a dependency exists for the source operand.

Dispatch control unit 84 applies the dispatch rules to the instructions in instruction queue 80 and causes as many instructions as possible to be dispatched from instruction queue 80. For pipeline 50 shown above, up to four floating point instructions can be selected for dispatch in a particular clock cycle: 2 floating point load/store instructions, a floating point add/subtract instruction, and a floating point multiply/divide instruction.

There may be many dispatch rules employed by dispatch control unit 84. Generally, the dispatch rules ensure that the instructions selected for dispatch can execute (along with the other instruction previously selected and concurrently selected for dispatch) using the hardware provided within microprocessor 10. Additional dispatch rules may be added to simplify the hardware employed within microprocessor 10. Because the number of dispatch rules may be large (and hence the amount of logic employed to determine which instructions can be dispatched may be large as well), it may be difficult to update main scoreboard 92 to reflect the destination operands of floating point instructions selected for dispatch during the clock cycle that the instructions are dispatched. Preliminary scoreboards 90A–90D are therefore employed. Dispatch control unit 84 forms preliminary scoreboards 90A–90D to reflect the destination operands of floating point instructions preliminarily selected for dispatch to the corresponding pipelines. Near the end of the dispatch clock cycle, dispatch control unit 84 determines which of the preliminarily selected instructions are actually dispatched (i.e. dispatch control unit 84 completes evaluation of the dispatch rules). Dispatch control unit 84 stores, in dispatch valid storage 94, a valid indication corresponding to each floating point pipeline. The valid indication identifies whether or not the corresponding pipeline received a validly dispatched instruction. During the subsequent clock cycle, the valid indications are used by update logic 96 to qualify the merging of preliminary scoreboards 90A–90D into main scoreboard 92. Additionally, dependency checking unit 82 receives the qualified versions of preliminary scoreboards 90A–90D for performing dependency checking during the subsequent clock cycle.

Main scoreboard 92 is thereby updated with indications of destination operands for each floating point instruction dispatched into pipeline 50. The indications are removed (i.e. set to the state indicating no dependency) when the destination operand becomes available for subsequent instructions (e.g. when the destination operand has been stored into FP register file 28 or when the destination operand is available for forwarding). For the embodiment of FIG. 4, latency control unit 88 performs the indication removal portion of updating main scoreboard 92. Latency control unit 88 determines the latency (in clock cycles) for each dispatched floating point instruction and notes the destination operand for that instruction. The latency depends on the type of floating point instruction (and hence which pipeline the instruction is dispatched to), and may depend upon the data operated upon in response to the instruction. When the number of clock cycles determined by latency control unit 88 expires, latency control unit 88 signals update logic 96 to remove the corresponding indication from main scoreboard 92. As an alternative to determining latencies using latency control unit 88, execution pipelines 56A–56E may be configured to signal dispatch unit 16 when data corresponding to an instruction becomes available. A combination of signalling techniques and latency determination may be implemented as well. For example, data dependent latencies may employ the signalling technique while static latencies may use the latency determination technique.

Figure 5:
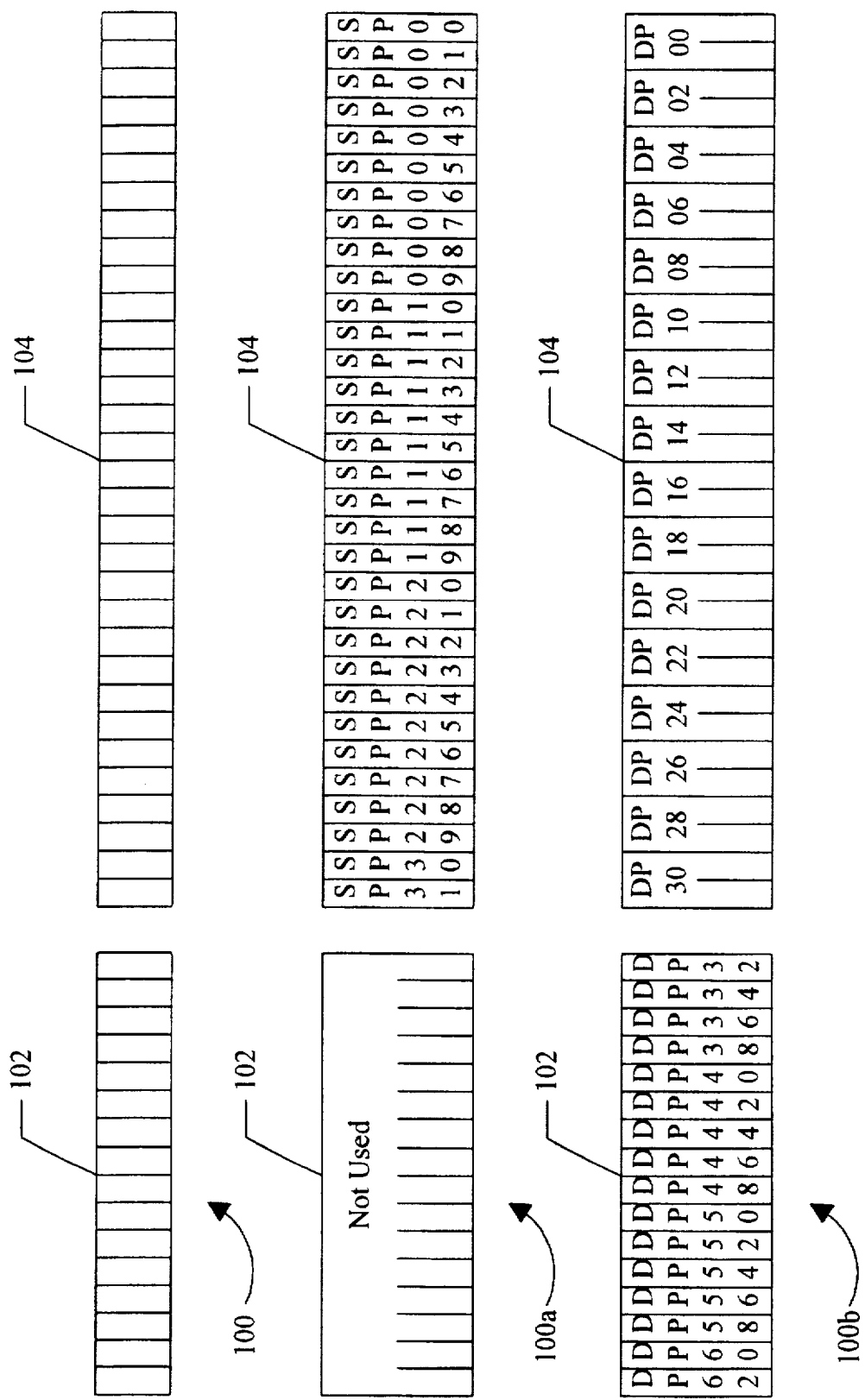
FIG. 5 is a diagram of a scoreboard entry and the interpretation of the entry for both single precision and double precision numbers.

Turning next to FIG. 5, a diagram of one embodiment of a scoreboard 100 is shown. Each of preliminary scoreboards 90A–90D and main scoreboard 92 may be configured as shown in FIG. 5. Scoreboard 100 includes a first portion 102 and a second portion 104. First portion 102 corresponds to storage locations 40A–40N shown in FIG. 2, and second portion 104 corresponds to storage locations 42A–42N shown in FIG. 2.

First portion 102 comprises a bit corresponding to each of storage locations 40A–40N. The bit, when set, indicates that an update to the corresponding storage location 40A–40N is outstanding within execution pipelines 56A–56E. When clear, the bit indicates that no update to the corresponding storage location 40A–40N is outstanding.

Second portion 104 comprises a pair of bits corresponding to each storage location 42A–42N. One of the bits corresponds to the upper portion 44A–44N of the corresponding storage location 42A–42N, and the other bit corresponds to the lower portion 46A–46N of the corresponding storage location 42A–42N. The bits are indicative, when set, of an update to the corresponding portion of the storage location and, when clear, of no outstanding update to the corresponding portion of the corresponding storage location.

FIG. 5 illustrates, at reference numeral 100a, a mapping of the indications stored in scoreboard 100 to the single precision floating point registers within FP register file 28 for an embodiment employing SPARC™. First portion 102 does not include indications for single precision floating point registers, and therefore is not used. Second portion 104 includes an indication for each single precision register. When a single precision register is used as a destination operand of a floating point instruction, the corresponding indication is set according to the mapping shown at reference numeral 100a. When a single precision register is used as a source operand, the corresponding indication is selected according to the mapping shown at reference numeral 100a.

At reference numeral 100b, FIG. 5 illustrates a mapping of the indications stored in scoreboard 100 to the double precision floating point registers within FP register file 28 for an embodiment employing SPARC™. First portion 102 includes an indication for the double precision floating point registers which do not overlap with the single precision floating point registers. Second portion 104 includes an indication for each double precision register which overlaps with a pair of single precision registers. Each double precision indication within second portion 104 comprises the indications corresponding to the single precision floating registers which overlap the corresponding double precision register. If an update is outstanding for either of the single precision registers, a dependency is detected for the corresponding double precision registers. Similarly, an outstanding update to the corresponding double precision register is indicated by setting both indications. Access to either single precision register or to the double precision register thereby detects a dependency.

The mappings shown at reference numerals 100a and 100b in FIG. 5 use either "SP" (single precision) or "DP" (double precision) followed by a register number as defined in the SPARC™ instruction set descriptions. The register address encoded into the instruction is the same as the register number for single precision registers (i.e. a five bit binary number equal to the decimal numbers shown). The register address differs from the register number for double precision registers. If the register number as represented as a six bit binary number corresponding to the register number, the least significant bit is discarded and the most significant bit is stored into the least significant bits place to form the five bit register address.

It is noted that, in many programs, single precision and double precision updates to the same storage location 42A–42N are not mixed. However, single precision and double precision instructions may be mixed in the same program. The scoreboard organization shown in FIG. 5 adeptly handles the mixed precision and correctly detects dependencies for each precision. Furthermore, in cases in which single precision and double precision updates to the same storage location 42A–42N are mixed, the scoreboard correctly detects dependencies between the two precisions updating the same location.

Figure 6:
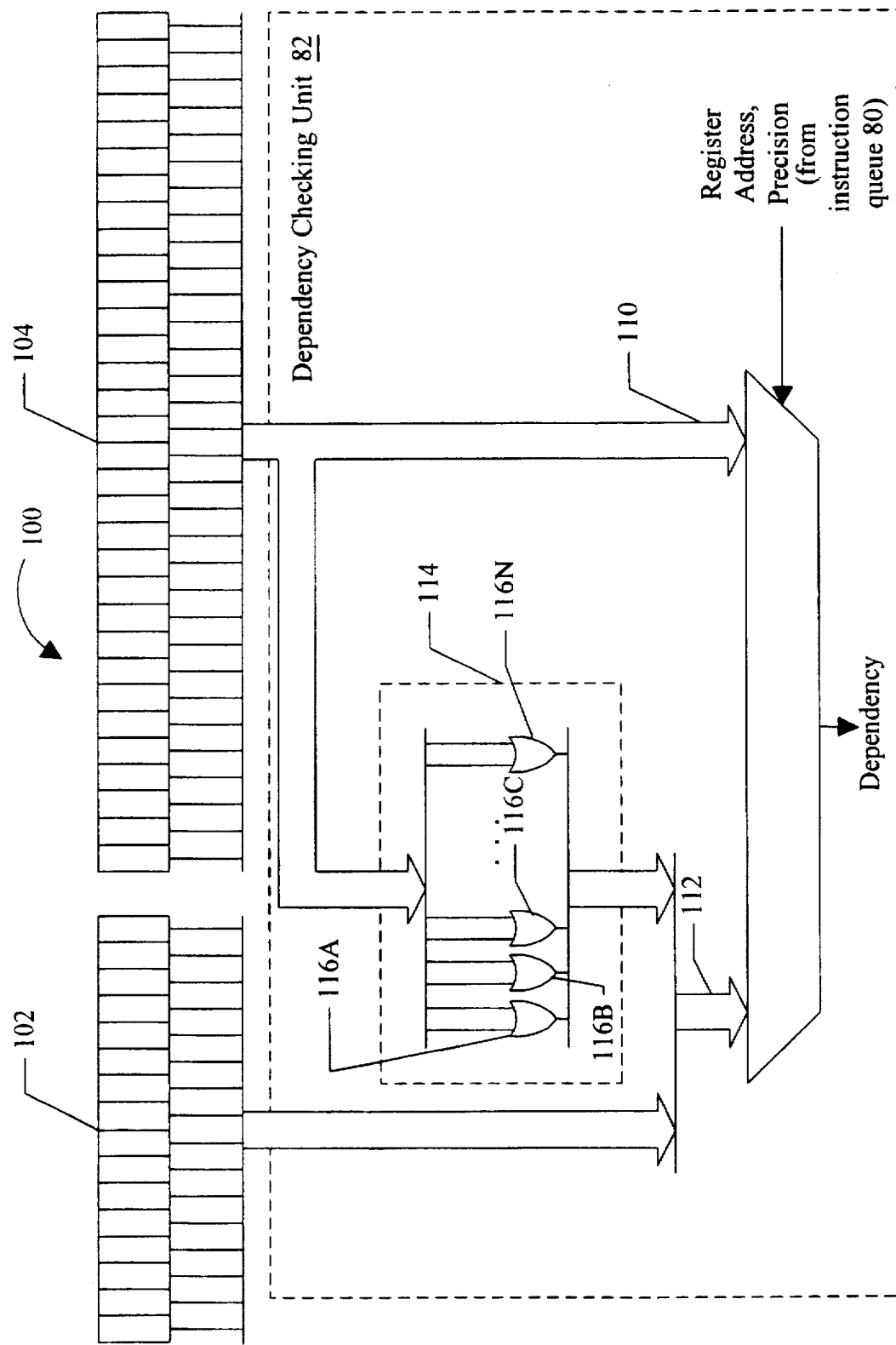
FIG. 6 is a diagram illustrating dependency checking circuitry for a source operand according to one embodiment of a dependency checking unit shown in FIG. 5.

Turning next to FIG. 6, a block diagram illustrating a portion of one embodiment of dependency checking unit 82 is shown connected to scoreboard 100. The portion illustrated in FIG. 6 provides dependency checking for a source operand of a floating point instruction from scoreboard 100. For pipeline 50, four such portions may be included for two source operands of each of the two floating point instructions (a floating point add/subtract type and a floating point multiply/divide type). Additionally, portions may be included for each preliminary scoreboard 90A–90D and main scoreboard 92. Alternatively, the contents of preliminary scoreboards 90A–90D and main scoreboard 92 may be merged prior to feeding dependency checking unit 82.

Dependency checking unit 82 forms a first set of indications 110 corresponding to the single precision floating point registers. First set of indications 110 is selected from second portion 104 of scoreboard 100. Additionally, dependency checking unit 82 forms a second set of indications 112 corresponding to the double precision floating point registers. The second set of indications are selected from first portion 102 of scoreboard 100 and the output of a logical combination block 114. Logical combination block 114 combines the indications stored in second portion 104 of scoreboard 112 to form the corresponding double precision indications. For the embodiment of FIG. 5, logical combination block 114 comprises a plurality of OR gates 116A–116N. Each OR gate 116A–116N forms a double precision indication from the corresponding single precision indications stored in second portion 104 of scoreboard 100.

Dependency checking unit 82 selects the dependency indication for the source operand from first set of indications 110 and second set of indications 112 based upon the source precision and the source register address. By maintaining the indications as shown in scoreboard 100, the first and second set of indications may be rapidly generated (e.g., in one level of logic), and then a simple selection process performed. Advantageously, the dependency indication is rapidly generated without a large amount of dependency checking logic.

Figure 7:
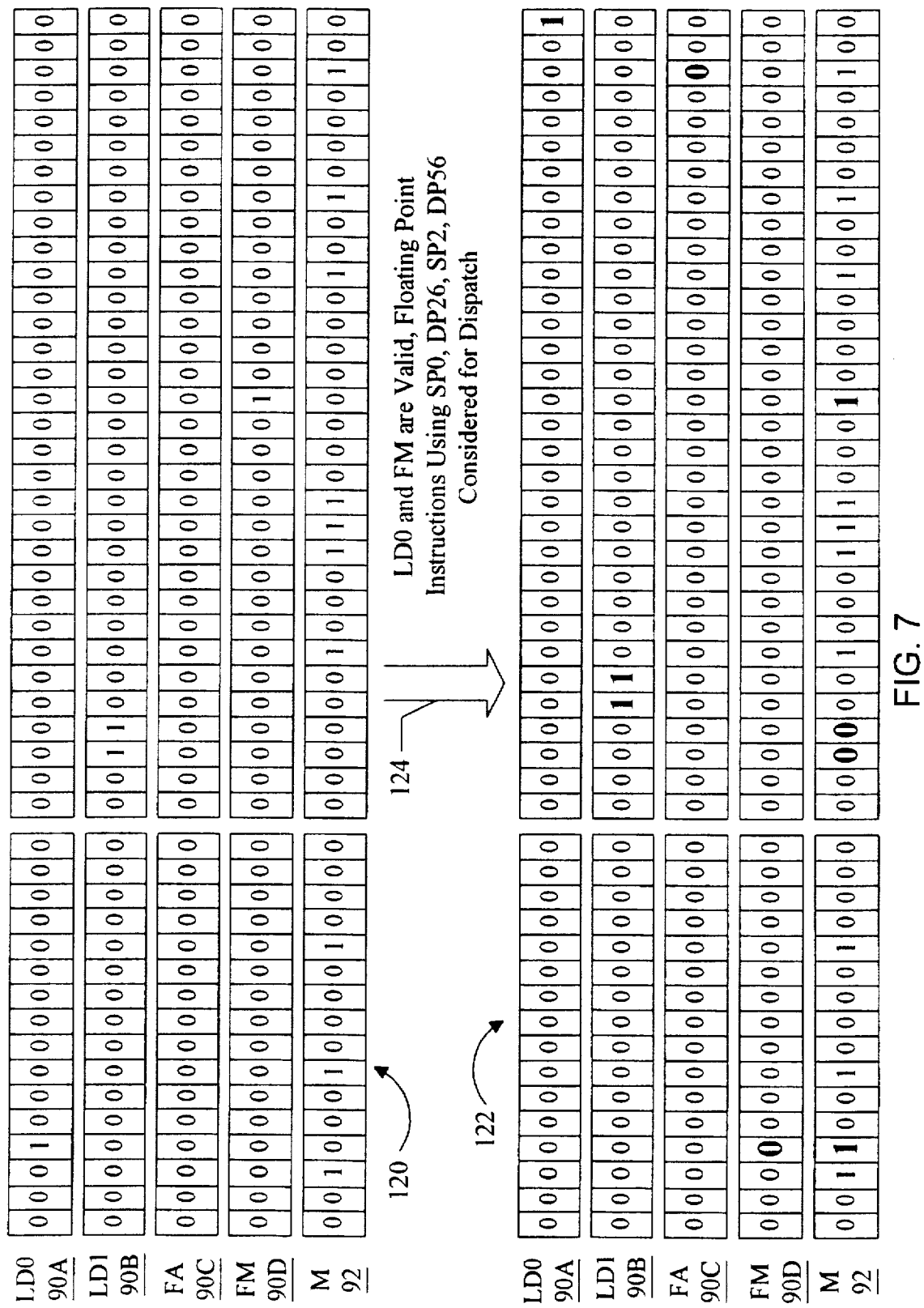
FIG. 7 is an example of scoreboard update and use of the scoreboard for dependency checking.

Turning now to FIG. 7, an example of the use of preliminary scoreboards 90A–90N and main scoreboard 92 for dependency checking is shown. An initial state of the scoreboards for a first clock cycle is shown at reference numeral 120, and a final state during a second clock cycle succeeding the first clock cycle is shown at reference numeral 122. Changes between initial state 120 and final state 122 are illustrated by bold-faced numerals which are larger than the other numerals (except for the clearing of preliminary scoreboards 90A–90N of the values from the initial state).

Initial state 120 indicates preliminary dispatch of (i) a floating point instruction to LD0 pipeline 56A having a destination operand of floating point register DP56; (ii) a floating point instruction to LD1 pipeline 56B having a destination operand of floating point register DP28; (iii) and floating point instruction to FM pipeline 56D having a destination operand of floating point register SP25. Additionally, main scoreboard 92 notes several outstanding updates of both single and double precision registers.

As noted next to arrow 124, the preliminary dispatch of instructions to LD0 pipeline 56A and FM pipeline 56D are determined to be valid. Therefore, the corresponding preliminary scoreboards 90A and 90D shown at reference numeral 120 are merged into main scoreboard 92. On the other hand, since the preliminary dispatch into LD1 pipeline 56B is not validated, the corresponding preliminary scoreboard 90B is not merged into main scoreboard 92. The bold-faced numerals within main scoreboard 92 at reference numeral 122 reflect these updates.

As additionally noted next to arrow 124, instructions having floating point registers SP0, DP28, SP2, and DP56 as destination operands are considered for dispatch during the second clock cycle to LD0 pipeline 56A, LD1 pipeline 56B, FA pipeline 56C, and FM pipeline 56D, respectively. Since instructions considered for dispatch to LD0 pipeline 56A and LD1 pipeline 56B are floating point load/store instructions having integer registers as source operands, no dependencies are detected via the scoreboards shown. Therefore, these instructions are selected for dispatch as illustrated by the bold-faced numerals in preliminary scoreboards 92A and 92B.

The floating point add instruction considered for dispatch to FA pipeline 56C has source operands of SP29 and SP2 in the present example. Source operand SP29 would detect a dependency upon DP14 if the instruction in LD1 pipeline 56B were indicated as validly dispatched. However, that instruction was not validly dispatched. The floating point add instruction is not precluded from dispatch due to having SP29 as a source operand. Source operand SP2 is dependent, however, upon an instruction indicated as outstanding in main scoreboard 92. Therefore, the floating point add instruction is precluded from dispatching. The indication corresponding to SP2 (the destination operand of the floating point add instruction) is therefore reset as illustrated in FIG. 7.

A floating point multiply instruction is also considered for dispatch to FM pipeline 56D in the second clock cycle. The floating point multiply instruction has DP0 and DP56 as source operands. An examination of the DP0 portion of the scoreboards illustrated at reference numeral 120 indicates no dependency for DP0. However, DP56 is dependent upon the instruction preliminarily dispatched to LD0 pipeline 56A during the first clock cycle. Since this instruction was validly dispatched, a dependency is detected. The floating point multiply instruction is thereby precluded from dispatching.

In accordance with the above disclosure, a dependency checking apparatus is shown which allows rapid detection of dependencies among registers having different precisions. Because the apparatus operates rapidly, it may be suitable for higher frequency microprocessors in which other dependency apparatuses fail. Employing the present apparatus in a microprocessor may allow the microprocessor to achieve a higher frequency (i.e. shorter clock cycle), thereby allowing for increased microprocessor performance.

Numerous variations and modifications will become apparent to those skilled in the art once the above disclosure is fully appreciated. It is intended that the following claims be interpreted to embrace all such variations and modifications.

What is claimed is:

1. A method for dependency checking a source operand in a microprocessor, comprising:

storing a plurality of indications corresponding to a first plurality of registers having a first precision and to a second plurality of registers having a second precision in a scoreboard, wherein said plurality of indications identify which of said first plurality of registers and said second plurality of registers are updated by instructions within a pipeline of said microprocessor;

forming a first subset of said plurality of indications corresponding to said first plurality of registers;

forming a second subset of said plurality of indications corresponding to said second plurality of registers;

selecting a dependency indication from said first subset of said plurality of indications if a source precision corresponding to said source operand is said first precision; and selecting said dependency indication from said second subset of said plurality of indications if said source precision is said second precision.

2. The method as recited in claim 1 wherein said selecting a dependency indication, from said first subset uses said source address to select said dependency indication within said first subset.

3. The method as recited in claim 2 wherein said selecting said dependency indication from said second subset uses said source address to select said dependency indication within said second subset.

4. The method as recited in claim 1 wherein said microprocessor includes a register file in which a first storage location is shared by one of said first plurality of registers and at least two of said second plurality of registers.

5. The method as recited in claim 4 wherein at least two of said plurality of indications corresponding to said at least two of said second plurality of registers are indicative of said first storage location being updated by instructions within said pipeline.

6. The method as recited in claim 5 wherein said forming said first subset comprises logically combining said at least two of said plurality of indications.

7. The method as recited in claim 6 wherein said logically combining comprising ORing.

8. The method as recited in claim 5 further comprising indicating an update to said one of said first plurality or registers by placing each of said at least two of said plurality of indications corresponding to said at least two of said second plurality of registers into a state indicating update.

9. A method for dependency checking a source operand in a microprocessor having a register file representing a first set of registers having a first precision and a second set of registers having a second precision, wherein a first storage location within said register file is shared by one of said first set of registers and at least two of said second set of registers, the method comprising:

maintaining a scoreboard indicating which of a plurality of storage locations which comprise said register file are updated by instructions within a pipeline of said microprocessor, said scoreboard indicating which portions of said first storage location are updated;

forming a first set of indications corresponding to said first set of registers from said scoreboard;

forming a second set of indications corresponding to said second set of registers from said scoreboard; and selecting a dependency indication from said first and second sets of indications in response to a source register address and a source precision corresponding to said source operand.

10. The method as recited in claim 9 wherein said forming a first set comprises logically combining a number of said second set of indications corresponding to said portions of said first storage location to generate a first one of said first set of indications corresponding to said one of said first set of registers.

11. The method as recited in claim 9 wherein said maintaining comprises forming a preliminary scoreboard corresponding to a first instruction being selected for dispatch during a first clock cycle.

12. The method as recited in claim 11 wherein said maintaining further comprises merging said preliminary scoreboard with said scoreboard during a second clock cycle if said first instruction is validly dispatched during said first clock cycle.

13. The method as recited in claim 12 wherein said maintaining further comprises inhibiting said merging if said first instruction is not validly dispatched.

14. The method as recited in claim 11 wherein said maintaining further comprises removing an indication within said scoreboard upon data corresponding to a second instruction which causes said indication to be placed into said scoreboard becoming available.

15. The method as recited in claim 14 wherein said data becoming available comprises forwarding of said data.

16. The method as recited in claim 14 wherein said data becoming available comprises said data being stored into said register file.

* * * * *